Figure 1:
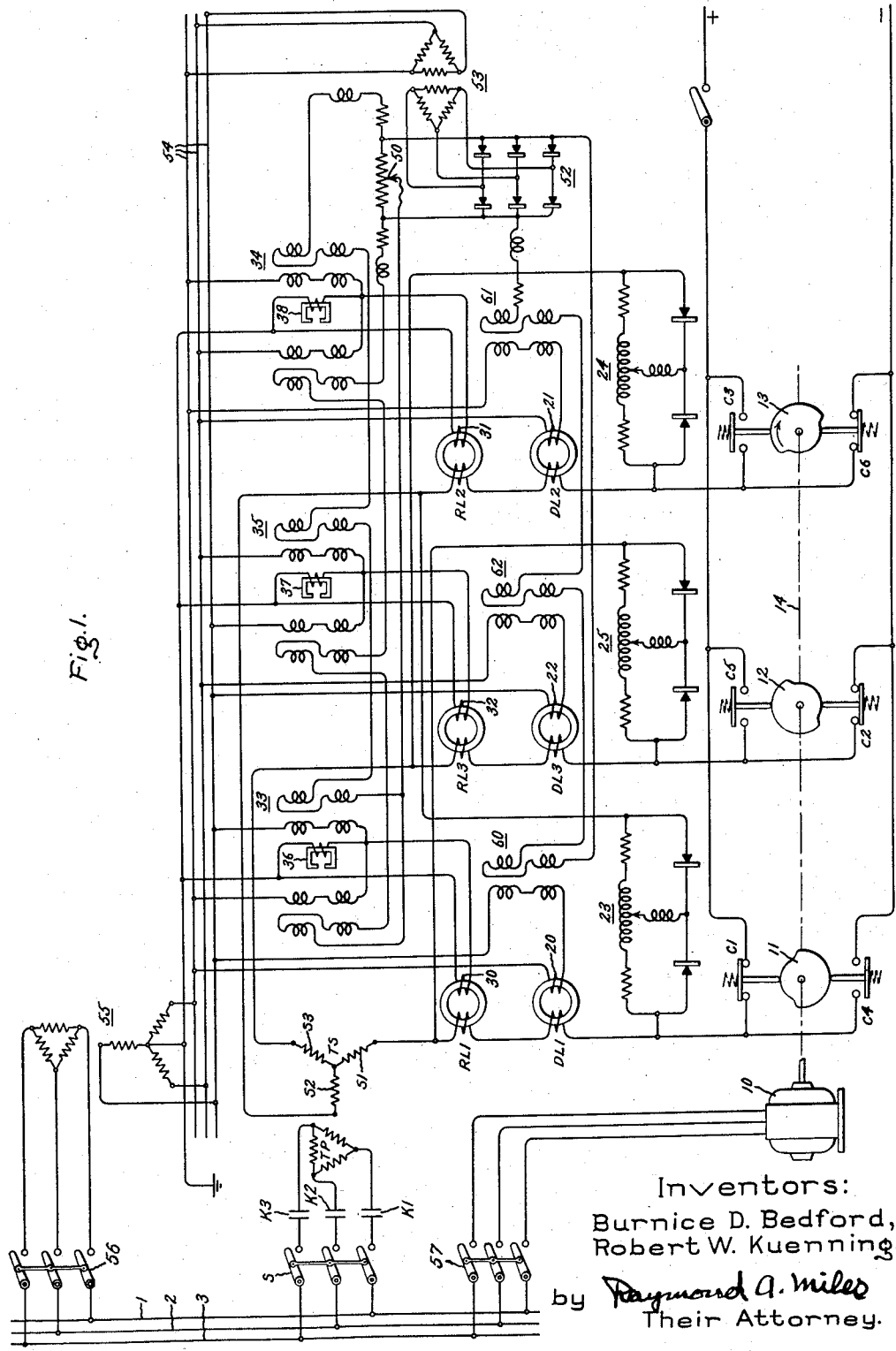

Inventors:
Burnice D. Bedford,
Robert W. Kuenning,
by Raymond A. Mills
Their Attorney.

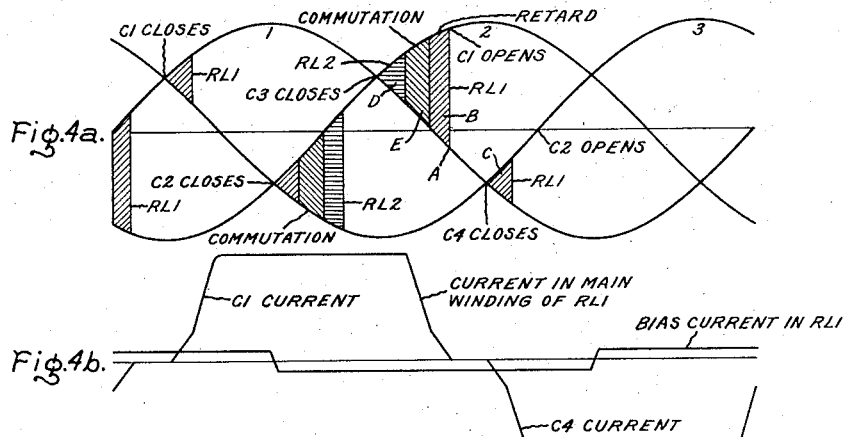

Inventors:
Burnice D. Bedford,
Robert W. Kuenning,
by Raymond A. Miles
Their Attorney.

United States Patent Office 2,889,511
Patented June 2, 1959

2,889,511

MECHANICAL RECTIFIER CURRENT AND VOLTAGE CONTROL

Burnice D. Bedford, Scotia, N.Y., and Robert W. Kuenning, Livermore, Calif., assignors to General Electric Company, a corporation of New York Application April 19, 1954, Serial No. 424,088

12 Claims. (Cl. 321—48)

The invention relates to mechanical rectifiers for changing alternating current to direct current, and more particularly to improved current discriminating and voltage control systems and apparatus for alternating current rectifiers having synchronously operated overlapping circuit closing and opening contacts for commutating current from successive phase voltage circuits or windings to a load circuit to produce load current rectification.

The improved discriminating control systems and apparatus of the present invention, although not limited thereto, are particularly adapted for producing sparkless load current commutation and load voltage control in mechanical rectifiers of the variable load current responsive capacitor commutating voltage producing type with fixed contact conducting and contact overlap, or current transfer, periods such as described and claimed in the Schmidt, Jr., Titus and Willis Patent 2,697,198 issued on December 14, 1954, and in the Schmidt, Jr. Patent 2,797,381 issued on June 25, 1957.

In accordance with the usual practice in such mechanical rectifiers, a saturable commutating or current drag out reactor is connected in series with each rectifier contact to control sparking. Such a commutating reactor is intended to desaturate near the end of commutation of the load current from the outgoing phase contact to the overlapping incoming phase contact, and in its unsaturated state the reactor is effective to temporarily limit the current flow through the outgoing phase contact to a relatively low value at the time the outgoing phase contact opens to end its current conduction period. Thus, commutating reactors can materially reduce contact sparking and thereby increase the life of the rectifier contacts while operating under substantially constant load current and voltage conditions. But they leave much to be desired in case the rectifier contacts are required to open while carrying any substantial values of current as may occur under widely varying load current or voltage conditions, particularly when the rectifier contact current conducting and overlap periods are of fixed duration.

Under all conditions the most important factors in successful operation of any mechanical rectifier are the contact life and the contact maintenance requirements. In continuous rectifying service with the ordinary 60-cycle commercial frequency, each contact must close and open over five million times each day. Hence, the contact wear per cycle must be practically zero in order to obtain a satisfactory contact life of the order of several months. Some slight mechanical wear, due to the physical pounding of the contacts produced by the rapidly repeated closing thereof, is unavoidable. But any electrical wear due to sparking either upon opening or closing of the contacts may produce such rapid transfer or removal of the contact material as to require contact servicing or replacement within a vary few hours or even minutes. The best contact materials available are not good enough to give a satisfactory rectifier contact life unless sparking under all normal operating conditions is reduced to the absolute minimum. Thus, sparkless operation of the mechanical rectifier contacts under all normal varying load current and voltage conditions is the desired goal and the present invention provides a combination of improved contact current limiting and diverting means and voltage controlling means for reaching this goal.

We have discovered that by combining the usual contact commutating current limiting reactor with an improved discriminating current conducting circuit including a pair of opposing auxiliary rectifiers capable of presenting a very low impedance for current flow up to a predetermined value and connected to shunt current from each rectifier contact, any lower value of current through the outgoing phase contact as limited by the commutating reactor may be entirely diverted from the contact at the time the contact opens so as to eliminate sparking and thereby greatly lengthen the contact life and reduce the contact maintenance requirements.

In addition, our improved combination also provides a voltage limiting action that enables the inverse voltage impressed on the outgoing phase contact to be held to a relatively low value for a short time after the contact opens and in this way prevents restriking of an arc and thus serves to further reduce the contact wear to a minimum.

Accordingly, it is a general object of the present invention to provide improved current and voltage limit apparatus capable of producing sparkless closing and opening of the contacts of a mechanical rectifier under all normal varying load current and voltage conditions.

It is another general object of our invention to provide an improved combination of co-operating current and voltage controlling reactor means that will enable the output voltage of the mechanical rectifier to be varied as desired with fixed contact conducting and overlap periods and without sparking. This renders the mechanical rectifier with fixed contact conducting and overlap periods and sparkless commutation suitable for supplying industrial type loads where some voltage regulation is required.

Still another object is to enable the rectifier output voltage controlling reactor means to also serve as a contact closing current limiting means, so as to further eliminate sparking and thereby further lengthen the contact life and reduce the contact maintenance service. A specific object of the invention is to provide an improved form of current discriminating apparatus consisting of a pair of rectifiers connected in series opposition in a circuit and provided with means for supplying or circulating a predetermined value of current through at least one of the rectifiers to limit the current flow in the circuit through the other rectifier to a corresponding value.

Such a discriminating current cutoff circuit can be made to present a very low impedance to any current flow up to the predetermined value, as well as a very high impedance that will effectively prevent current flow above such value. Furthermore, the predetermined current limit value can be readily varied by varying the value of the calibrating current, thus providing a current discriminating control combination having a field of use not necessarily limited to rectifiers.

In carrying out our invention in one form, we provide rectifier output voltage controlling means, or retard reactors, which co-operate with the outgoing phase contact current limiting commutating or drag out reactors and with an improved contact current diverting and voltage limit circuit combination to accomplish three functions. The first function is to eliminate the need for shifting the incoming phase contact closing time in order to reduce the rectifier output voltage, i.e. produce what is termed "phase retard." The second is to automatically eliminate the need for shifting the outgoing phase contact opening time to avoid sparking due to voltage control or retard. The third is to function as a closing reactor so as to limit the current to a negligible value when the incoming phase contact closes to start the contact overlap period in order to minimize sparking due to any bounce of the contact while appreciable voltage is impressed thereon.

In order to accomplish these three functions the rectifier output voltage controlling or retard reactor is provided with a magnetization biasing winding which is excited with a small square wave of current of adjustable magnitude and arranged to saturate the retard reactor at a very low value of current compared to the normal load current. The retard reactor, like the drag out or commutating reactor, may be formed of a rectangular hysteresis loop nicaloi iron or the like having an abrupt saturation characteristic. In accordance with the present invention a separate air gap reactor is shunted across the biasing winding of the retard reactor in order to provide enough slope to the magnetization characteristics thereof that the flux will quite accurately correspond to the load current in the main retard reactor winding. This enables the magnetizing current of the retard reactor to be made several times greater than the magnetizing current of the drag out reactor so as to allow the eddy currents resulting from rapid flux changes in the retard reactor sufficient time to decay while there is still sufficient voltage on the commutating reactor to avoid undesirable interference. Furthermore, in order to reverse the polarity of the square wave current energizing the retard reactor biasing winding, preferably two square wave circuits of opposite polarity are provided for energizing the biasing winding of the retard reactor so that the preponderance therebetween can be varied to continuously vary the polarity of magnetization of the retard reactor from one polarity to the other.

Figure 2:
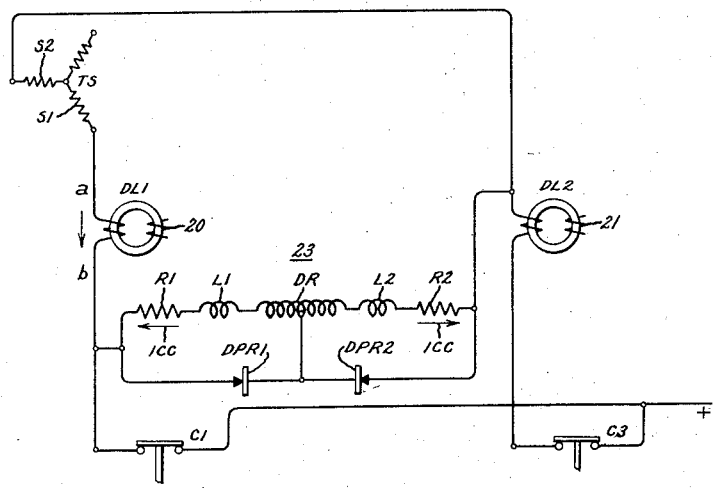
Figure 3A:
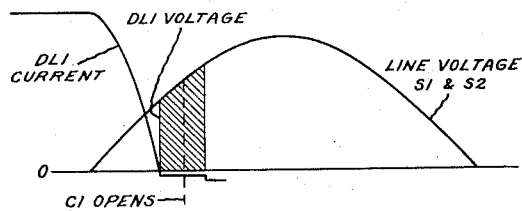
Figure 3B:
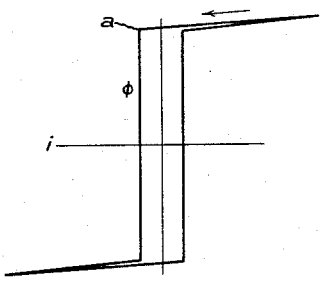
Figure 3C:
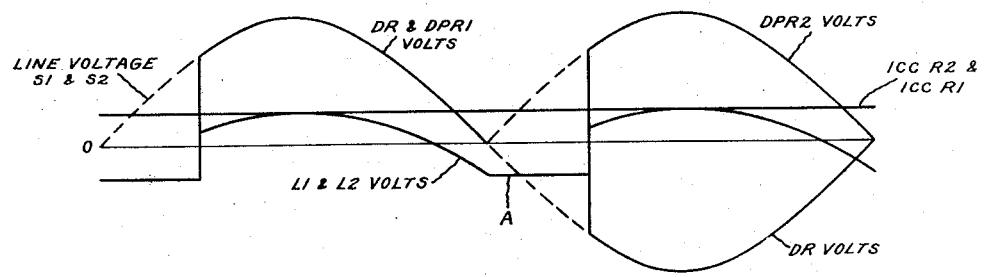
Figure 5:
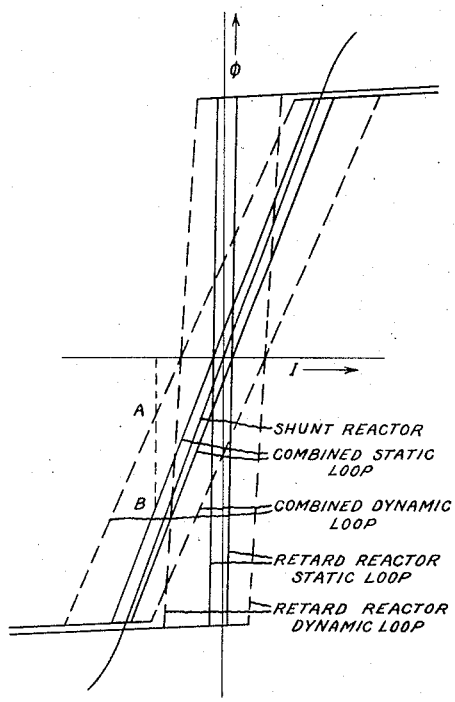
Figure 6:
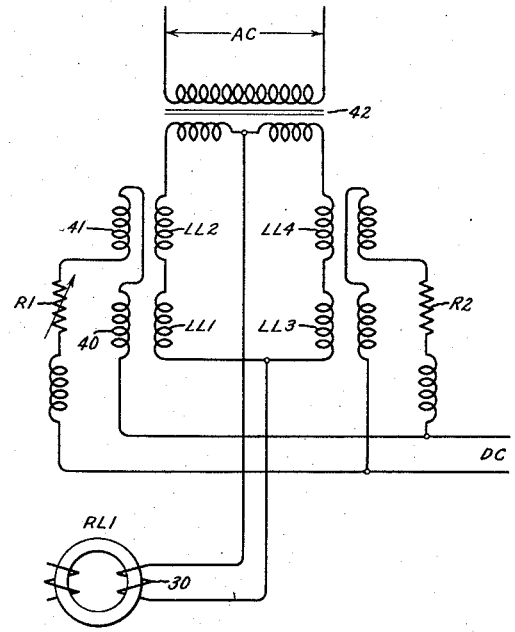
Figure 7:
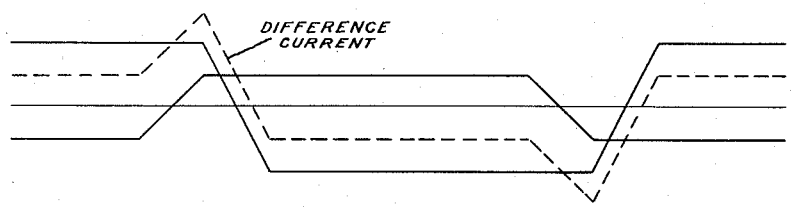

The features of the improved current and voltage control systems and apparatus of the present invention which are believed to be novel are set forth with particularity in the appended claims. Such improved systems and apparatus, however, both as to their organization and method of operation, together with further objects and advantages thereof, may best be understood by reference to the following description taken in connection with the accompanying drawings in which Fig. 1 is a schematic circuit diagram of a mechanical rectifier embodying the current and voltage control improvements of the present invention. Fig. 2 is an enlarged simplified schematic circuit diagram taken partially from Fig. 1 to facilitate an explanation of the co-operation of the commutating or drag out reactor with the improved current and voltage limit apparatus in eliminating sparking upon the opening of the rectifier contacts. Figs. 3a, 3b, and 3c are charts showing the relationship of the various currents, voltages, and fluxes involved in the co-operating drag out reactor and current limit circuit combination of Fig. 2. Figs. 4a, 4b, and 4c are charts showing with respect to time various relationships of the voltages, currents, and fluxes involved in the co-operation of the retard reactors shown in Fig. 1. Figs. 4d, 4e, and 4f are charts drawn to a time scale different than Figs. 4a–4c to aid in explaining the relationships between the load current commutated by the rectifier and the voltages produced by the retard and drag out reactors for controlling the wave shapes of the rectified load current at the end and beginning of successive contact conduction periods. Fig. 5 is a chart showing the method of decreasing the slope and increasing the magnetizing current of the retard reactor by combining a non-saturable shunt reactor therewith. Fig. 6 shows the two relatively variable square wave circuits of opposite polarity that are fed into the bias winding of the retard reactor in order to variably control the output voltage of the rectifier by variation of the composite differential current produced thereby as illustrated in Fig. 7.

As shown in Fig. 1 energy is transmitted from 3-phase alternating current power supply lines 1, 2, and 3 through suitable disconnecting switches or circuit breakers S, the commutating voltage supply series capacitors K1, K2, K3, the delta connected transformer primary windings TP, the Y-connected transformer secondary windings TS, the load voltage controlling or retard reactors RL1, RL2, and RL3, the commutating or drag out reactors DL1, DL2, DL3 and the series of synchronously closing and opening rectifier contacts C1, C5, C3, and C4, C2, C6 to the variable direct current load circuit indicated as + and —. The series commutating capacitors K1, K2, K3 preferably are provided in accordance with the invention described and claimed in the Schmidt, Jr. Patent 2,797,381 issued on June 25, 1957, in order to permit preclosing of the rectifier contacts before the incoming phase to neutral voltage equals the outgoing phase to neutral voltage so as to substantially neutralize the line-to-line voltage commutating action. This enables the series capacitors K1, K2, and K3 that are charged in accordance with the variable load current to supply a correspondingly variable commutating voltage to effect transfer of the widely variable load current from the outgoing phase contact to the incoming phase contact during a constant or fixed contact overlap period.

As illustrated in Fig. 1 the contacts C1, C5, and C3 serve to connect the successive phase circuits or windings S1, S2, S3 of the transformer secondary winding TS to the positive load current line + and the contacts C4, C2, and C6 serve to connect the successive phase circuits or windings to the negative load line. These contacts are periodically closed and opened in synchronism with the polyphase voltages of supply lines 1, 2, 3 by means of the synchronous motor 10. This motor is energized preferably through a step-down transformer not shown and switch 57 from the alternating current supply lines 1, 2, 3. The synchronous motor 10 drives suitable contact operating mechanism indicated schematically as the equiangularly displaced cams 11, 12, and 13 on the shaft 14 and the reciprocating push rods co-operating therewith so as to overlap the closing and opening of the contacts C1 to C6 to provide contact conduction and overlap periods of fixed duration. The contact operating mechanism may be of the improved form described and claimed in the Fullerton Patent 2,713,095 issued on July 12, 1955. If desired, the timed sequence of the contact overlaps may be synchronized in such manner that the points of equality of the successive phase to neutral voltage occur substantially in or slightly before the middle of the contact overlap periods so that the line-to-line commutating voltage impressed on the overlapping contacts will reverse at these points in accordance with the principle of the previously mentioned Schmidt, Jr. Patent 2,797,381.

Each phase circuit or phase winding S1, S2, S3 of the rectifier is provided with a corresponding one of the commutating or drag out reactors DL1, DL2, DL3 having corresponding magnetization control or biasing winding 20, 21, 22 and also with a corresponding one of the improved current diverting or voltage limiting circuit indicated generally by the reference characters 23, 24, and 25 arranged to co-operate with the drag out reactors to produce sparkless opening and closing of the corresponding pairs of contacts C1 and C4, C3 and C6, C5 and C2 that connect the respective phase windings S1, S2, S3 sequentially to either the positive or negative load lines indicated as + and —.

In order to explain how the sparkless opening of each contact is obtained reference is now made to Fig. 2 which illustrates the condition of the rectifier apparatus during commutation of the load current from the outgoing phase circuit or winding S1 to the incoming phase circuit or winding S2 during the fixed overlap period of the corresponding contacts C1 and C3. Under these conditions the usual drag out or commutating reactor DL1 is provided to hold the outgoing contact current to a negligibly low value for a brief interval following the end of the transfer of the load current from contact C1 to contact C3, and the contact C1 is opened to end the contact overlap period while the drag out reactor DL1 is effective. To accomplish this the drag out reactor DL1 may be of the conventional closed core sharply saturating form, preferably being formed of rectangular hysteresis loop nicaloi material so as to saturate at a relatively low value of the load current as indicated in Fig. 3b. The reactor magnetization preferably is controlled by the biasing winding 20 so that as the load current of phase winding S1 flowing through contact C1 is transferred to phase winding S2 through the overlapping contact C3, the reactor DL1 will desaturate at approximately the moment load current commutation is completed as indicated in Fig. 3a.

The biasing or exciting winding 20 and associated energizing circuit (not shown in Fig. 2) are arranged, as will be explained hereinafter, to provide sufficient M.M.F. to desaturate reactor DL1 just before the load current in the main winding of this reactor decreases to zero. When unsaturated, the permeability of the reactor DL1 becomes extremely high and the reactor is able effectively to impede or delay any further current change in its windings. Practically the entire voltage difference between phase windings S1 and S2 will be across the now highly inductive main winding of the unsaturated reactor DL1, and the magnetic flux linkages $N\phi$ in the reactor core begin changing at a rate determined by the instantaneous value of this difference voltage. The difference voltage (line voltage S1 and S2) has been shown with respect to time in Fig. 3a, it being understood that S2 is positive with respect to S1 for the period illustrated.

The shaded area under the voltage curve in Fig. 3a is the "volt seconds" capacity of the commutating or drag out reactor DL1. Those skilled in the art will understand that the term "volt seconds" refers to the integral over a given period of a time of the instantaneous magnitude of voltage across the windings of an unsaturated reactor. Thus volt seconds are a measure of the total change of flux linkages in the reactor core during the aforesaid given period. For a specific reactor construction and number of winding turns, a predetermined amount of volt seconds (the shaded area in Fig. 3a) will be required to take the reactor completely through its unsaturated region, that is, to change the magnetic flux from its saturation level in one direction to its saturation level in the opposite direction. During this period of changing flux, there can be practically no change of current in the reactor windings (Fig. 3b). As can be seen in Fig. 3a, the volt seconds of the reactor DL1 become effective for a brief interval beginning at the end of commutation, and the outgoing phase contact C1 opens while the unsaturated reactor is thus limiting the current flow through contact C1 to a relatively negligible value.

The improved current diverting and voltage limiting circuit, indicated generally by the reference character 23 in Fig. 2, is interconnected between the contact C1 and the contact C3 in order to co-operate with the drag out reactor DL1 in eliminating sparking upon opening of the contact C1. This improved current diverting and voltage limit circuit comprises in accordance with the present invention a pair of reversely connected auxiliary rectifiers DPR1 and DPR2, preferably of the contact type as indicated schematically in Figs. 1 and 2, together with means for supplying or circulating a calibrating current through at least one or preferably both of the rectifiers. In order to explain the unique discriminating current limit principle of the improved circuit including the two rectifiers in series opposition and the improved results to be obtained thereby, let us assume that opposite calibrating currents of equal value are supplied to or circulated through these auxiliary rectifiers DPR1 and DPR2 by some suitable means, for example, of the resistances R1 and R2, the inductances L1 and L2 and the voltage distributing or balancing reactor DR that are interconnected as shown in Fig. 2 and function in the manner explained more fully hereinafter. Each of the rectifiers DPR1 and DPR2 has the conventional inverse resistance characteristic that effectively blocks current flow in the reverse direction through the rectifier. But with forward biasing or calibrating current being supplied to such a rectifier, the rectifier circuit can readily conduct reverse current of any magnitude less than the magnitude of calibrating current. The rectifier, although apparently passing reverse current, is actually still conducting a net current in the forward direction. With a predetermined calibrating current ICC flowing in each one of the oppositely poled auxiliary rectifiers DPR1 and DPR2 of Fig. 2, a superimposed current having a magnitude less than ICC can flow freely in either direction through the circuit. However, any current greater than ICC would tend to reverse the direction of net current in one of the auxiliary rectifiers, and the inherent inverse resistance of this rectifier will block the flow of such reverse current. Thus the two auxiliary rectifiers connected in series opposition present negligible resistance to the flow of current less than ICC in either direction through the combined circuit, but the superimposed current is positively limited to a magnitude not exceeding the magnitude of calibrating current. During the time the current is being limited, inverse voltage will appear across the rectifier and thus across the calibrating current supply circuit. Consequently the calibrating current supply means must be of sufficiently high impedance to render the inherent inverse resistance of the rectifiers effective to limit the current flow. Such an improved discriminating current limit circuit arrangement has various advantages that are not limited to diverting current from rectifier contacts or switches. Thus it will be apparent to those skilled in the art that such improved current limit circuit may be utilized in other current control services if desired.

During the contact overlap period when C1 and C3 are both closed there can be no voltage on the rectifiers DPR1 and DPR2 except the forward drops due to the equal currents ICC. The two forward drops are equal and opposite so their sum is zero. During the main commutation of a variable load current from phase winding S1 to phase winding S2 which may be produced in a contact overlap period of fixed duration by the load current charged capacitors K1 and K2 shown in Fig. 1, DL1 is fully saturated against the opposite magnetizing bias of its exciting winding 20 by the load current flowing in a forward direction from $a$ to $b$ through the main winding of DL1 as indicated by the arrow in Fig. 2. As phase winding S2 becomes more positive than phase winding S1, the load current in DL1 will be materially reduced and may tend to reverse near the end of the contact overlap period. At a very small magnitude of forward load current, as determined by the M.M.F. provided by the biasing winding 20, the high impedance unsaturated region of the drag out reactor DL1 will be reached and line-to-line voltage appears across the main winding of DL1. In this way further change in the current through the drag out reactor DL1 is delayed and contact C1 may be opened while the current is approximately zero.

When contact C1 opens any small forward or reverse current in the contact circuit, which current will be limited by the drag out reactor DL1 to a magnitude less than ICC is readily diverted from contact C1 through the bypass circuit 23 including the opposing rectifiers DPR1 and DPR2. At this moment the only significant voltage drop in the interconnected circuits shown in Fig. 2 is across the unsaturated reactor DL1, the voltage drop in rectifiers DPR1 and DPR2 being quite small since the superimposed current is less than the rectifier calibrating currents ICC. The magnitude of ICC is selected to be slightly greater than the magnitude of current that will just saturate the drag out reactor DL1 when flowing in the main winding of this reactor. Consequently, circuit 23 will freely conduct sufficient current to enable reactor DL1 to continue through its unsaturated region and resaturate in the reverse direction after contact C1 has opened.

Since C3 remains closed during the time immediately after C1 opens and the drag out reactor DL2 is now saturated by the full load current in its main winding, the voltage impressed on the outgoing phase contact C1 will be equal to the voltage existing across the opposing rectifiers DPR1 and DPR2. During this time, that is before reactor DL1 resaturates, the current diverting circuit 23 functions to limit the voltage across contact C1. Current less than ICC is being diverted by circuit 23, and this limited extra current through rectifier DPR1 will be in one direction and through DPR2 will be in the reverse direction. Thus the forward drop of rectifier DPR1 may be increased and the forward drop of rectifier DPR2 decreased, or vice versa. This will give a net small limited voltage on the outgoing phase contact C1. Consequently contact C1 may carry a small limited positive or negative current just prior to opening and be subjected to a small limited positive or negative voltage just after opening. After the volt seconds of the drag out reactor DL1 are all used up, this reactor resaturates in its reverse direction and the current in its main winding can immediately rise a slight amount to the limit set by the rectifier calibrating currents ICC. Now the reactor voltage is negligible and full inverse voltage will appear across the outgoing phase contact C1, but by that time this contact will be opened sufficiently so that it will successfully withstand such inverse voltage.

The magnitude and polarity of the current through the drag out reactor DL1 just before contact C1 opens is controlled by the biasing current energizing the biasing winding 20 of the drag out reactor. Such biasing current shifts the magnetization curve as seen from the main reactor winding in series with the contact along the current axis an amount equal to the biasing M.M.F. or ampere turns, and it is possible to reduce the magnitude of the drag out current to a very low value by such biasing energization. As a result, the rating of the current limiting circuit can be reduced and likewise the current through the outgoing phase contact C1 at opening can be reduced.

In order to oppositely energize the current limiting rectifiers DPR1 and DPR2 in the manner indicated above, the rectifier inverse voltages may be utilized in a self-excited arrangement such as shown in Figs. 1 and 2. The inverse voltage across DPR1 is roughly a half sine wave corresponding to the voltage difference between phase windings S1 and S2 while contact C1 is open and drag out reactor DL1 is saturated. This inverse voltage is shown in Fig. 3c with positive polarity being assumed when S2 is positive with respect to S1. The auxiliary rectifier DPR2 is subjected to a similar but 180-degree displaced inverse voltage. When the respective inverse voltages are applied to the reactive branches L1, R1 and L2, R2 of the circuit 23, each reactive branch will act in a conventional manner to maintain therethrough a substantially constant flow of current ICC.

In order to obtain the desired degree of smoothness of the calibrating current ICC without resorting to excessively large inductance elements or reactors L1 and L2, the voltage dividing reactor or auto-transformer DR is provided and interconnected as shown in Figs. 1 and 2 to force equal and opposite instantaneous currents in both reactive branches of the circuit 23. The voltage dividing reactor DR preferably comprises a winding having two inductively and conductively interconnected halves of equal turns. The common point of the winding is connected to the common point of the series opposing auxiliary rectifiers DPR1 and DPR2, and the two halves are respectively connected in series circuit relationship with the reactive branches L1, R1 and L2, R2 which shunt the rectifiers DPR1 and DPR2, respectively. The inverse voltage of an auxiliary rectifier divides substantially equally in the associated shunting circuit between the reactive branch and its series related half of reactor DR. The voltage drop across this half of DR is reflected by an induced voltage rise of equal magnitude in the other half, and consequently substantially the same amount of voltage (about one-half of the inverse voltage) is simultaneously applied to both of the reactive branches L1, R1 and L2, R2. Thus the inverse voltage across the rectifier DPR1 is split by the voltage dividing reactor DR so that half is across L1 and R1 and half is across L2 and R2. Similarly, the inverse voltage across rectifier DPR2 is split by DR between L1, R1 and L2, R2. The resulting voltage of inductance L1 or L2 as well as the voltage drop across each resistor R1 and R2 have been illustrated in Fig. 3c, and it can be seen that the lowest frequency ripple across L1 and L2 is second harmonic. By making a lower voltage available for a longer period of time, the voltage dividing reactor DR enables sufficiently smooth biasing or calibrating currents ICC to be maintained by relatively small inductive elements L1 and L2.

It is not essential to have the current flow through the rectifiers DPR1 and DPR2 absolutely free of ripple. The important criterion is that the current ICC, at the moment an outgoing phase contact opens, must be greater than the contact current as limited by the commutating reactor DL1, whereby substantially unimpeded current transfer can take place from the outgoing phase contact to the current diverting circuit including the rectifiers DPR1 and DPR2. At this time the calibrating current ICC will be near its minimum, but it is desirable to keep the maximum of the calibrating current ICC down in order to keep the rating of the equipment down. Thus, a compromise may be desirable since the more ripple eliminated from the calibrating current ICC the larger the inductances L1 and L2 must be. In practical operation, the magnitude of the calibrating current ICC will be dependent on the line voltage and will have some variation with load current when the series capacitors K1, K2, and K3 are used. However, as long as the minimum of the calibrating current ICC is kept high enough, any higher variation of ICC becomes of secondary importance as this will always insure operation of the rectifier under all normal variable load current and voltage conditions without any perceptible sparking at the rectifier contacts. In order to make sure that the unique discriminating current limit operation of the circuit 23 shown in Fig. 2 is fully understood, it may be further explained as follows. While contact C1 is open, the current limit circuit 23 becomes subjected to the full line voltage between phases S1, S2 since the drag out reactor DL1 in series therewith will become saturated and hence will not limit the voltage applied to circuit 23. Under such full line voltage conditions during a particular half cycle current will tend to flow through DPR1, the right-hand half of DR, L2 and R2. By autotransformer action DR will produce an equal current flow through the left-hand half of DR, L1, R1 and DPR1. But on the opposite half cycle current will tend to flow through DPR2, the left-hand half of DR, L1 and R1. By autotransformer action DR will produce an equal current flow through the right-hand half of DR, L2, R2 and DPR2. In each case the value of current flow is dependent upon the relatively high impedance values of R1, L1, L2 and R2, since DR has a relatively small magnetizing current. But such current value is sufficient to saturate DL1.

When contacts C1 and C3 are both closed to transfer the rectified current conduction from contact C1 to contact C3, reactor DL2 will quickly become saturated, while reactor DL1 becomes unsaturated only shortly before the instant that contact C1 opens. Under these conditions reactor DL1 absorbs practically all the line voltage but the reactors L1, L2 will continue to circulate substantially equal currents of predetermined value through the auxiliary rectifiers DPR1 and DPR2, although their voltages are in opposition and hence balance out across the bypass circuit 23. As a result a very low impedance circuit will be established between contacts C1 and C3 through the rectifiers DPR1 and DPR2 in series opposition and the saturated reactor DL2. Consequently, when contact C1 opens, the low impedance part of bypass circuit 23 provided by rectifiers DPR1 and DPR2 in series opposition permits an immediate transfer of any current up to the predetermined limited value from contact C1 to contact C2 with no appreciable voltage across contact C1. After a period of time DL1 will become saturated again, and the line voltage will again become effective to produce the predetermined maximum limited current flow through the bypass circuit 23 with a resulting greater voltage established across contact C1. But by this time contact C1 has opened sufficiently that the establishment of such greater voltage across the bypass circuit 23 cannot produce any sparking or arcing across the contact C1.

In order to control the output voltage of the rectifier with the contact conduction and overlap periods of fixed duration, the saturable retard reactors RL1, RL2, and RL3 are connected in series with the commutating reactors DL1, DL2, DL3, in the phase winding circuits S1, S2, and S3. As shown in Fig. 1 these retard reactors are provided respectively with magnetization biasing windings 30, 31, and 32 which are adjustably excited with a small square wave of current from the square wave generators 33, 34, and 35 in the manner more fully explained hereinafter. These output voltage control or retard reactors are arranged to saturate at a very low value of current compared to the load current of the rectifier, but which is materially larger than the saturating current of the commutating reactors DL1, DL2, and DL3.

Depending on the magnitude of the square wave biasing current, a retard reactor desaturates and goes through a part of its full volt seconds range toward the end of each period of forward load current conduction, and any remaining volt seconds will be effective at the start of the succeeding period of reverse load current conduction while the reactor resaturates in its reverse direction. A similar and symmetrical situation will exist 180 electrical degrees away. When a retard reactor is unsaturated and volt seconds are used up at the start of current conduction through a contact, the rate of rise of current will be limited to a relatively low value and the start of commutation is delayed until the retard reactor becomes saturated. This action of the reactors RL1, RL2, and DL3 in retarding the start of the load current conduction is known as phase retard and enables a voltage reduction of the direct current load circuit to be obtained.

For simpliicty of presentation, the contacts of the rectifier may be assumed to open at the instant the load current commutation has been completed from the outgoing phase contact C1 to the incoming phase contact C3 and the current through the outgoing contact is zero. This will allow the effects of the retard reactor to be considered independently. Actually, at the end of the load current conduction period of the outgoing contact C1 and after the retard reactor RL1 has gone through only a part of its volt second range, depending on the bias current magnitude, the associated drag out or commutating reactor DL1 desaturates thereby temporarily limiting the current to a relatively low value and permitting the contact C1 to open without sparking at any time during this subsequent period of limited current.

The adjustable manner in which the volt seconds of the retard reactor RL1 may be used is illustrated in Figs. 4a, b, and c. As indicated in Fig. 4a the square wave bias current of the retard reactor RL1 is set to give a relatively small amount of phase retard, with most of the volt seconds of the retard reactor RL1 being used up after the commutation of the current from the rectifier contact C1 to contact C3. This is accomplished by letting the bias current provide sufficient mmf to unsaturate reactor RL1 while there is still a significant amount of outgoing load current in the main winding of this reactor, whereby a major part (but less than all) of the total flux change in the unsaturated region of RL1 will be realized as the load current decreases to zero. Whenever the retard reactor RL1 is unsaturated and the net ampere turns on RL1 are *changing* in the high permeability region of the iron curve, the magnetic flux in the reactor core will change at a rate controlled by the instantaneous magnitude of voltage across the reactor winding. Such flux-time and the resulting volt second relationships are shown in Fig. 4c.

Since two overlapping contacts of the rectifier such as C1 and C3 or C5 and C1 are always closed when voltage appears on the retard reactor RL1, the voltage on RL1 will always be a section of the line-to-line voltage as shown in Fig. 4a. This figure shows the complete voltage relationships for the load current commutation or transfer from the outgoing phase contact C1 to the incoming phase contact C3. All the voltages developed on the retard reactor RL1 are shown. It will be understood that the voltage on the other retard reactors RL2 and RL3 are similar.

It may be assumed for the purposes of the present description that the incoming phase contact C3 closes at voltage zero. The shaded area D in Fig. 4a is the volt seconds required by the retard reactor RL2 in the incoming phase circuit to complete its saturation in a forward direction. Commutation, as indicated by area E, takes place immediately following the saturation of RL2. Toward the end of commutation, the load current in the outgoing phase circuit decreases to a point which causes the retard reactor RL1 to unsaturate, thereby retarding further current change. This point of desaturation is determined by the magnitude of the square wave biasing current, which magnitude may be varied as desired. The shaded area B in Fig. 4a represents the volt seconds of reactor RL1 while undergoing a flux change in its unsaturated region. Eventually at point A the load current in the outgoing phase has decreased to zero and rectifier contact C1 opens. At this point, the retard reactor RL1 is still in an unsaturated state. But when rectifier contact C4 closes to initiate the next commutating period, the reactor RL1 will come out of its unsaturated region and be saturated in the reverse direction as the load current attempts to rise. The volt seconds required to complete the reverse saturation of RL1 is indicated as shaded area C in Fig. 4a, and since current change is impeded by RL1 during this time, the start of commutation is delayed or retarded and the voltage is reduced accordingly. Later in the operating cycle, just prior to the opening of contact C4, the retard reactor RL1 is again unsaturated, and when C1 closes to mark the beginning of its regular conduction period, RL1 will be able to resaturate in its forward direction. The sum of areas B and C will always be a predetermined constant amount equal to the total volt seconds required to take the retard reactor RL1 completely through its unsaturated region.

The criterion for successful operation of the rectifier under varying load current and voltage conditions with fixed conduction and overlap of the rectifier contacts is that the opening point A of the rectifier contact C1 should come at the same point in the cycle independent of the amount of retard or load voltage reduction provided by the retard reactor RL1. This of course will be equally true of the opening point of each of the other rectifier contacts. In Fig. 4a the sum of the area B, which represents the volt seconds of the retard reactor RL1 while in its initial unsaturated state at the end of commutation just prior to the opening of contact C1, plus area C, which represents the voltage reducing part of the volt seconds of the retard reactor RL1 while in its final unsaturated state following the closing of contact C4, must be constant regardless of how the two parts of the total volt seconds are divided. Since all three phases of the rectifier are symmetrical, area D which represents the voltage reducing part of the volt seconds of the retard reactor RL2 equals area C which represents the voltage reducing part of the volt seconds in retard reactor RL1. Therefore, area B plus area D is constant. Furthermore, at any given load current the volt seconds required to effect current commutating are constant so the corresponding commutating volt second area E is constant regardless of whether it is shifted forward or back a little with varying amounts of retard produced by different divisions of the total volt seconds in the retard reactor. Therefore, at a given load current the sum of area D plus area E plus area B is constant and point A must come at the same point in the cycle entirely independently of the amount of retard obtained by the different divisions of the total volt seconds of the retard reactor RL1.

Since the setting or allocation of the part of the total volt seconds of the retard reactor used at the end of commutation is dependent upon the value of the square wave biasing current, the magnetization curve of the iron of the retard reactor should have enough slope so that its magnetic flux will correspond quite accurately to the biasing current value. Therefore, in accordance with the present invention the steep slope of the square loop nicaloi iron of which the retard reactors RL1, RL2, and RL3 are formed is decreased by means of the air gap nonsaturable shunt reactors 36, 37, and 38 as shown in Fig. 1 to give a combined magnetization curve of lesser slope as indicated in Fig. 5. The square loop nicaloi iron is desirable for the retard reactor because of its abrupt saturation. But an air gap cannot readily be put into this material because of difficulties of handling. Therefore, an air gap cannot directly be used to decrease the slope of the magnetization curve of the nicaloi iron retard reactors. However, the separate nonsaturable air gap reactor 36 shunted across the bias winding of the retard reactor RL1 as indicated in Fig. 1 will give the desired slope characteristics to the combination if the resistances of the shunting reactor and the bias winding of the retard reactor are kept relatively low. Under these conditions the hysteresis loops of the shunting reactor and the retard reactor RL1 may be put in terms of current and flux linkages, as in Fig. 5 and added directly to get the combined hysteresis loop. Such combined characteristic can be treated as if it were the actual characteristic of the retard reactor with the externally supplied biased current and the main load current determining the local voltage reducing action of the retard reactor.

In order to adjustably energize the bias winding of the retard reactor RL1, the dual square wave current generator 33 having circuits as shown enlarged in Fig. 6 may be employed. In this fig. LL1 and LL2 are limiting reactors which are biased well above saturation by a D.-C. current supplied through windings 40 and 41, one reactor being biased positively and the other being biased negatively as shown. With this arrangement, current introduced through the alternating transformer 42 meets negligible impedance when it flows in the same direction as the D.-C. biasing current of the reactors LL1 and LL2 as this just takes the reactor further into saturation. In the other direction, it meets negligible impedance only up to a value where the mmf of the A.-C. winding is about equal that of the D.-C. winding. Then the net mmf in the reactor is very small and the iron enters the high permeability region. This presents a high impedance to further change of current so that the current is effectively limited. Since the two reactors LL1 and LL2 are biased oppositely, one limits the current in one direction and the other limits the current in the opposite direction. This gives an essentially square wave of current of magnitude determined by the D.-C. current.

When two square wave circuits of opposite polarity are fed into the bias winding 30 of the retard reactor RL1 as shown in Figs. 1 and 6 the net current in the bias winding is the difference of the two square wave currents. See Fig. 7. The first circuit including the reactors LL3 and LL4 may have a fixed D.-C. current biasing arrangement while the second circuit including the reactors LL1 and LL2 may have a variable D.-C. biasing current circuit produced by the variable resistor R1 as indicated in Fig. 6. If the first circuit has a current output approximately twice the output of the lower circuit, the current in the biasing winding of the retard reactor RL1 can be continuously varied from one polarity to the other by varying the variable resistor R1. Thus, by adjusting the resistor R1 the energization of the bias winding 30 of the retard reactor RL1 can be varied.

In a similar way, adjustment of the potentiometer sliding contact 50 shown in Fig. 1 will simultaneously vary the square wave output of the generators 33, 34, and 35. This will vary or adjust the energization of the biasing windings 30, 31, and 32 of the retard reactors RL1, RL2, and RL3, so as to either increase or decrease the output voltage of the rectifier. The potentiometer 50 is energized through the bank of 3-phase rectifiers 52 from the transformer 53, which in turn is energized from the 3-phase buses 54 supplied through the transformer 55 and switch 56 from the alternating supply lines 1, 2 and 3. The rectifier bank 52 also supplies D.-C. excitation to the square wave generators 60, 61, and 62 that serve to provide square wave energization of appropriate magnitude and phase relationship for the bias windings 20, 21, and 22 of the commutating or drag out reactors DL1, DL2, and DL3.

There is no major problem in using both retard reactors and drag out reactors in the same circuit, as long as the slope of the magnetization curve of the retard reactor is made substantially less than that of the drag out reactor and also the magnetizing current of the retard reactor is made substantially greater than that of the drag out reactor. Preferably this may be done by the use of an air gap nonsaturable reactor in shunt with the biasing winding of the retard reactor as described above.

Typical wave shapes of the retard reactor RL1 voltage and drag out reactor DR1 voltage are shown in Figs. 4e and 4f respectively, which are drawn to the same time scale as the load current wave form shown in Fig. 4d. In the latter figure the normal load current may be assumed to be carried through the contact C1 prior to the time at which contact C3 closes. Commutation of load current cannot begin immediately upon closure of contact C3 due to the action of the then unsaturated retard reactor RL2 in the incoming phase circuit. RL2 saturates at time 1, whereupon the load current starts to be commutated from contact C1 to contact C3. The load current commutation or transfer to contact C3 is practically finished at time 2 and hence the current flow through contact C1 has decreased to a relatively low value. At time 2 the retard reactor RL1 will become high impedance due to the decrease of the load current to the low value determined by its bias current. Consequently, from time 2 to time 3 the line-to-line voltage between phase windings S1 and S2 will appear across RL1 as indicated in Fig. 4e. At time 3 with almost no load current flowing the drag out reactor DL1 becomes high impedance and most of the line-to-line voltage between phase windings S1 and S2 will appear across DL1 as indicated in Fig. 4f. The unsaturated drag out reactor DL1, having higher permeability than RL1, will slow down the rate of current change and the voltage on the retard reactor RL1 will become very low. However, the eddy currents in the retard reactor RL1 will start to decay at time 3 giving a gradual transition of voltage between the retard reactor RL1 and the drag out reactor DL1. Preferably, the synchronous operating mechanism is designed to open contact C1 approximately in or slightly before the middle of the effective volt second range of the drag out reactor DL1, i.e. at time 4 when the load current is precisely zero. At time 5 the drag out reactor volt seconds are all used up. If the eddy current time constant in the retard reactor RL1 has been kept short enough, the eddy currents in RL1 will have decayed by time 5. From time 5 to time 6 a constant reverse current limited by the current limiting circuit 23 as previously described is flowing in the outgoing phase circuit, and the magnitude of this current, although great enough to saturate the drag out reactor DL1, is insufficient to reversely saturate the retard reactor RL1. Furthermore, immediately after the opening of contact C1, the voltage applied thereto is held to a very low value by the current limiting circuit even though part of the line-to-line voltage between phase windings S1 and S2 will appear across the retard reactor RL1 and part across the drag out reactor DL1. At time 6 rectifier contact C4 will close and the current build up in phase winding S1 will be limited by the retard reactor RL1 until the balance of its volt seconds are all used up and it saturates at time 7. As a result the line-to-line voltage between phase windings S1 and S2 will appear across the retard reactor RL1 during this interval as indicated in Fig. 4e. This will serve to delay the build up of current through contact C4 and thereby decrease the voltage output of the rectifier.

The principal reason for making the magnetizing current of the retard reactor RL1 higher than that of the drag out reactor DL1 is to allow eddy current in the retard reactor to decay while there is voltage on the drag out reactor. Consequently, it is important that the magnetizing current of the retard reactors be several times the magnetizing current of the drag out reactor and also the slope of the magnetization curve of the retard reactors must be less than that of the drag out reactors in order to obtain the co-ordinated action described above.

While we have shown and described a preferred form of our invention by way of illustration, many modifications will occur to those skilled in the art. We therefore contemplate by the claims which conclude this specification to cover all such modifications as fall within the true spirit and scope of our invention.

What we claim as new and desire to secure by United States patent is:

1. Polyphase current rectifying apparatus having in combination means including sequentially closing and opening contacts having overlapping closure periods for interconnecting successive phase circuits to commutate the load current therebetween, means including a saturable reactor for temporarily limiting the current in one phase circuit to less than a predetermined relatively low value when the corresponding contacts open, and bypass circuit means including a pair of rectifiers interconnected in series opposition between the one phase circuit and the succeeding phase circuit and provided with self-excited means for circulating biasing current of greater than said predetermined value through each rectifier for diverting the limited low value current from the corresponding contacts through the saturable reactor to prevent sparking and to limit the voltage between the corresponding contacts upon opening thereof said self-excited means comprising a pair of reactance circuits respectively connected in shunt with said rectifiers and a voltage dividing reactor having two inductively and conductively related windings serially connected in said reactance circuits, respectively, said reactance circuits and said reactor being selected with respect to each other so that substantially one-half of the inverse voltage alternately impressed across said rectifiers will appear across each of said reactor windings.

2. An alternating current rectifier having in combination means including a synchronously operable contact having fixed periods for closing and opening a load current rectifying circuit, a pair of reactor means saturable by the load current flow in the circuit, one of said reactor means having a greater saturating current value and a magnetization curve of substantially lower slope than the other, adjustable means for controlling the magnetization of the one reactor means to variably limit current flow in the circuit upon closure of the contact, and means for controlling the magnetization of the other reactor means to limit current flow in the circuit when the contact opens.

3. A doubleway alternating current rectifier having in combination means including a synchronously movable contact having fixed periods for closing and opening a load current rectifying circuit, a pair of reactor means saturable by the load current flow in the circuit, one having a greater saturating current value and a magnetization curve of substantially lower slope than the other, adjustable square wave means for controlling the magnetization of the one reactor means to variably limit current flow in the circuit upon closure of the contact and means for controlling the magnetization of the other reactor means to limit current flow in the circuit when the contact opens.

4. An alternating current rectifier having in combination means including a synchronously movable contact having fixed periods for closing and opening a load current rectifying circuit, a pair of reactor means saturable by the load current flow in the circuit, one having a greater saturating current value and a magnetization curve of substantially lower slope than the other, means including a pair of relatively adjustable square wave generators of opposite polarity for controlling the magnetization of the one reactor means to variably limit current flow in the circuit upon closure of the contact, and means for controlling the magnetization of the other reactor means to limit current flow in the circuit when the contact opens.

5. An alternating current rectifier having in combination means including a synchronously movable contact having fixed periods for closing and opening a load current rectifying circuit, a pair of reactor means saturable by the current flow in the circuit, one having a nonsaturable shunt reactor to provide a greater saturating current value and a magnetization curve of substantially lower slope than the other, means for controlling the magnetization of the one reactor means to limit current flow in the circuit upon closure of the contact, and means for controlling the magnetization of the other reactor means to limit current flow in the circuit when the contact opens.

6. An alternating current rectifier having in combination means including a synchronously movable contact having fixed periods for closing and opening a load current rectifying circuit, a pair of reactor means saturable by the load current flow in the circuit, one having a shunt reactor to provide a greater saturating current value and a magnetization curve of substantially lower slope than the other, adjustable square wave means for controlling the magnetization of the one reactor means to limit current flow in the circuit upon closure of the contact, and means for controlling the magnetization of the other reactor means to limit current flow in the circuit when the contact opens.

7. Alternating current rectifying apparatus having in combination, means including a synchronous movable contact having fixed periods for closing and opening a load current rectifying circuit, a first saturable reactor in the circuit provided with adjustable magnetization control means for limiting the current value in the circuit when the contact closes for a variable time thereafter to variably control the load circuit voltage, a second saturable reactor in the circuit provided with independent magnetization control means for limiting the circuit current to less than a first predetermined magnitude when the contact opens, and a by-pass circuit connected across said contact for freely shunting current of less than a second predetermined magnitude to prevent sparking upon both closure and opening of the contact, said second predetermined magnitude being greater than said first predetermined magnitude, said adjustable control means being adjusted so that said first reactor is unsaturated whenever the circuit current is less than a third predetermined magnitude which is greater than said second predetermined magnitude.

8. An alternating current rectifier having in combination means including synchronously operated contacts having fixed periods for closing and opening a load current rectifying circuit, a pair of reactor means saturable by the current flow in the circuit, one having a greater saturating current value and a magnetization curve of substantially lower slope than the other, means for controlling the magnetization of the one reactor means to limit current flow in the circuit upon closure of the contacts, means for controlling the magnetization of the other reactor means to limit current flow in the circuit when the contacts open, and bypass circuit means including a pair of rectifiers connected in series opposition and provided with means for supplying substantially constant and equal values of current through each rectifier for diverting the limited current from the contacts upon both closure and opening thereof.

9. An alternating current rectifier having in combination means including a synchronously operable contact having fixed periods for closing and opening a load current rectifying circuit, a pair of reactor means saturable by the load current flow in the circuit, one of said reactor means having a greater saturating current value and substantially lower permeability when unsaturated than the other, current diverting and limiting means connected across the contact to provide a substantially zero-impedance conducting path for current having less than a first predetermined magnitude and being substantially non-conductive of current greater than said first predetermined magnitude, adjustable bias means for supplying a controlled value of magnetomotive force to the one reactor means to unsaturate said one reactor means when the load current decreases below a second predetermined magnitude, said controlled value of magnetomotive force being insufficient to saturate said one reactor means with current of said first predetermined magnitude flowing in the circuit, and means for controlling the magnetization of the other reactor means in a manner causing said other reactor means to unsaturate when the load current decreases below a third predetermined magnitude and causing said other reactor to saturate with current of said first predetermined magnitude flowing in the circuit, said third predetermined magnitude being less than said second predetermined magnitude.

10. An alternating current rectifier having in combination means including synchronously operated contacts having fixed periods for closing and opening a load current rectifying circuit, a pair of reactor means saturable by the load current flow in the circuit, one of said reactor means having a lower saturating current value and substantially greater permeability when unsaturated than the other, means for controlling the magnetization of the one reactor means in a manner causing said one reactor means to unsaturate as the load current decreases below a first predetermined low magnitude, current diverting and limiting means connected across the contact to provide a substantially zero-impedance conducting path for current having less than a second predetermined magnitude and being substantially non-conductive of current greater than said second predetermined magnitude, said second predetermined magnitude being greater than said first predetermined magnitude, and adjustable bias means for supplying a controlled value of magnetomotive force to the other reactor means to unsaturate said other reactor means as the load current decreases below a third predetermined magnitude, said third predetermined magnitude being greater than said first predetermined magnitude and said controlled value of magnetomotive force being insufficient to saturate said other reactor means with current of said second predetermined magnitude flowing in the circuit.

11. Current limit apparatus having in combination a circuit subject to an alternating voltage and including a pair of rectifiers in series opposition, a pair of reactance circuits respectively connected in shunt with said rectifiers and energized solely by said alternating voltage to maintain a calibrating current of not less than a predetermined value in each one of said rectifiers thereby limiting the current flowing through the circuit to a magnitude not greater than the magnitude of said calibrating current, and an autotransformer comprising a winding having two portions of equal turns serially connected in said reactance circuits, respectively, each of said reactance circuits and each portion of said autotransformer being arranged in relation to each other so that said alternating voltage divides substantially equally between the reactance circuit and its series associated portion of said autotransformer.

12. Circuit controlling apparatus having in combination means including separable contacts for opening an alternating voltage circuit, and shunting means for diverting current from the contacts to prevent sparking upon separation thereof including a pair of rectifiers connected in opposition between the contacts, a pair of reactive circuits respectively connected in parallel with said rectifiers and energized solely by said circuit voltage to maintain at least a predetermined current through at least one of the rectifiers, and coupling means comprising a voltage dividing reactor interconnecting said reactive circuits, said circuit voltage being divided into two substantially equal parts by said reactor in combination with each of said reactive circuits.

References Cited in the file of this patent

UNITED STATES PATENTS

| | | |
|---|---|---|
| 1,669,493 | Slepian | May 15, 1928 |
| 2,227,937 | Koppelmann | Jan. 7, 1941 |
| 2,351,975 | Koppelmann | June 20, 1944 |
| 2,568,140 | Belamin | Sept. 18, 1951 |
| 2,617,974 | Kesselring et al. | Nov. 11, 1952 |

FOREIGN PATENTS

| | | |
|---|---|---|
| 506,015 | Great Britain | May 22, 1939 |
| 848,217 | Germany | Sept. 1, 1952 |